Feb. 16, 1932.   C. ROBINSON   1,845,520
AIRPLANE
Filed March 5, 1931   2 Sheets-Sheet 1

INVENTOR
Clark Robinson
BY
Harold D. Penney   ATTORNEY

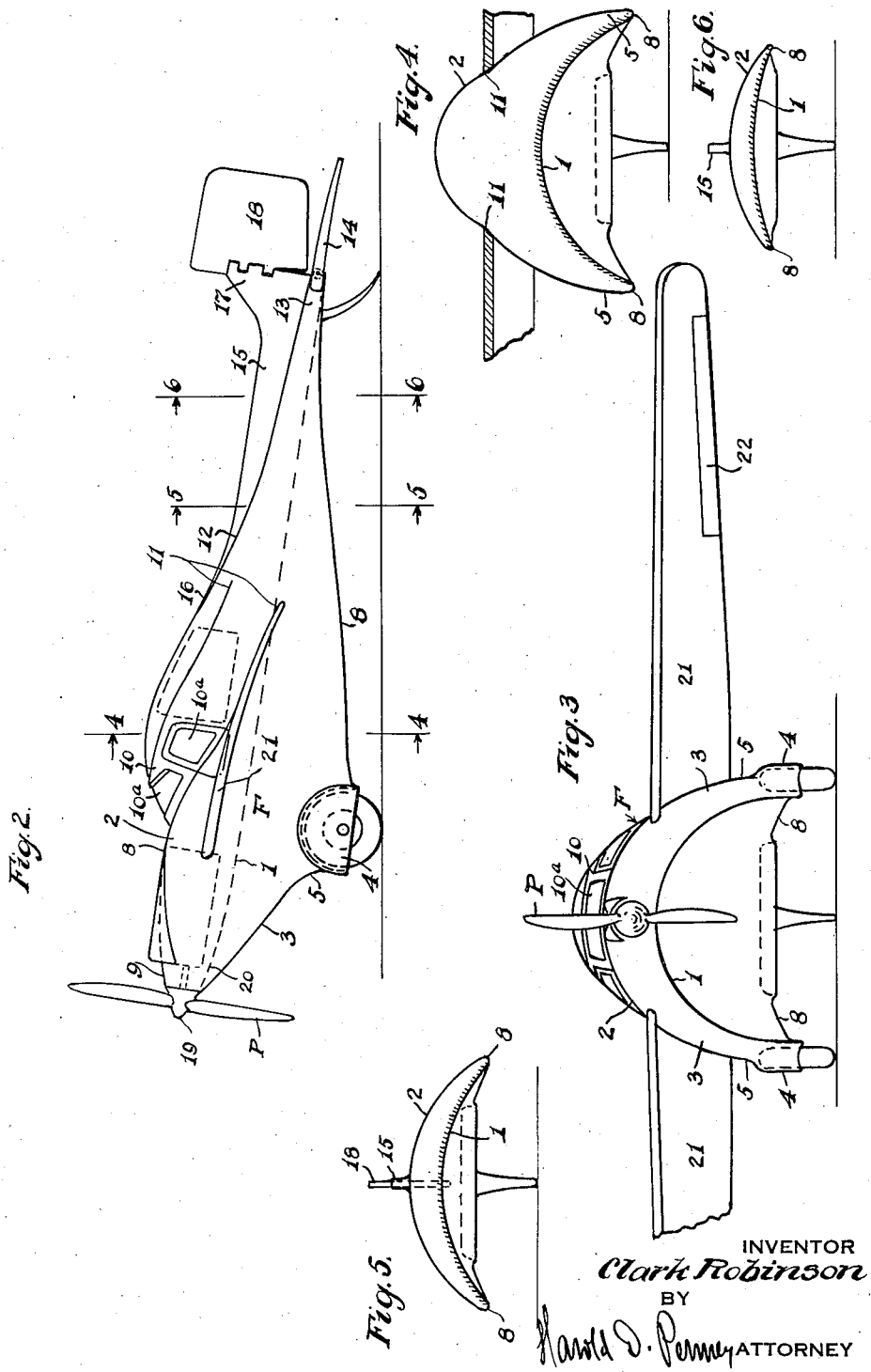

Patented Feb. 16, 1932

1,845,520

UNITED STATES PATENT OFFICE

CLARK ROBINSON, OF NEW YORK, N. Y.

AIRPLANE

Application filed March 5, 1931. Serial No. 520,206.

This invention relates to improvements in airplanes and has for its important object, the embodiment of a novel structure in which the main or principal plane surface takes the general form of an arched tunnel extending longitudinally thereof.

Another object of the construction includes the provision of a cabin or cockpit and engine space which coordinate to structurally reinforce and form the upper forward convex portion of the longitudinal wing structure, and are supported centrally thereof and over the same.

Another object of my invention resides in the stream lining of the entire structure so that it offers minimum wind resistance at the leading edges.

Another important object of my invention is the provision wherein the main or principal wing itself becomes a part of the fuselage wherein the cabin, engine gallery and other necessary or required compartments or spaces are all combined in a single or unitary body of rigid, reinforced construction and constituting a main plane in which the structural details are greatly improved to eliminate structural faults found in the present known types of devices of this class. The load and other strains are principally carried directly over the main wing or plane and directly supported thereby and by alined laterally extending auxiliary wings or planes.

An outstanding feature of my structure is that in the presence of the longitudinal concave-convex structure of the main wing surfaces thereof and the resultant extensions of the lower edges of the main-wing-fuselage construction, I may mount the usual landing wheels or pontoons directly upon this structure, such embodiments being of a very practical nature from an engineering standpoint, and is further desirable as eliminating considerable air resistance in the operation of the plane.
These and other capabilities will be ascertained as the herein description proceeds and it is obvious that modifications may be resorted to without departing from the spirit and scope of the invention claimed.
In the drawings:

Fig. 2 is a side elevation of the device;

Fig. 3 is a front view thereof;

Fig. 4 is a diagrammatic vertical cross sectional elevation taken on the line 4—4 of Fig. 2, looking rearwardly;

Fig. 5 is a similar view but taken on the line 5—5 of Fig. 2;

Fig. 6 is a further similar view taken on the line 6—6 of Fig. 2.

Figure 1:
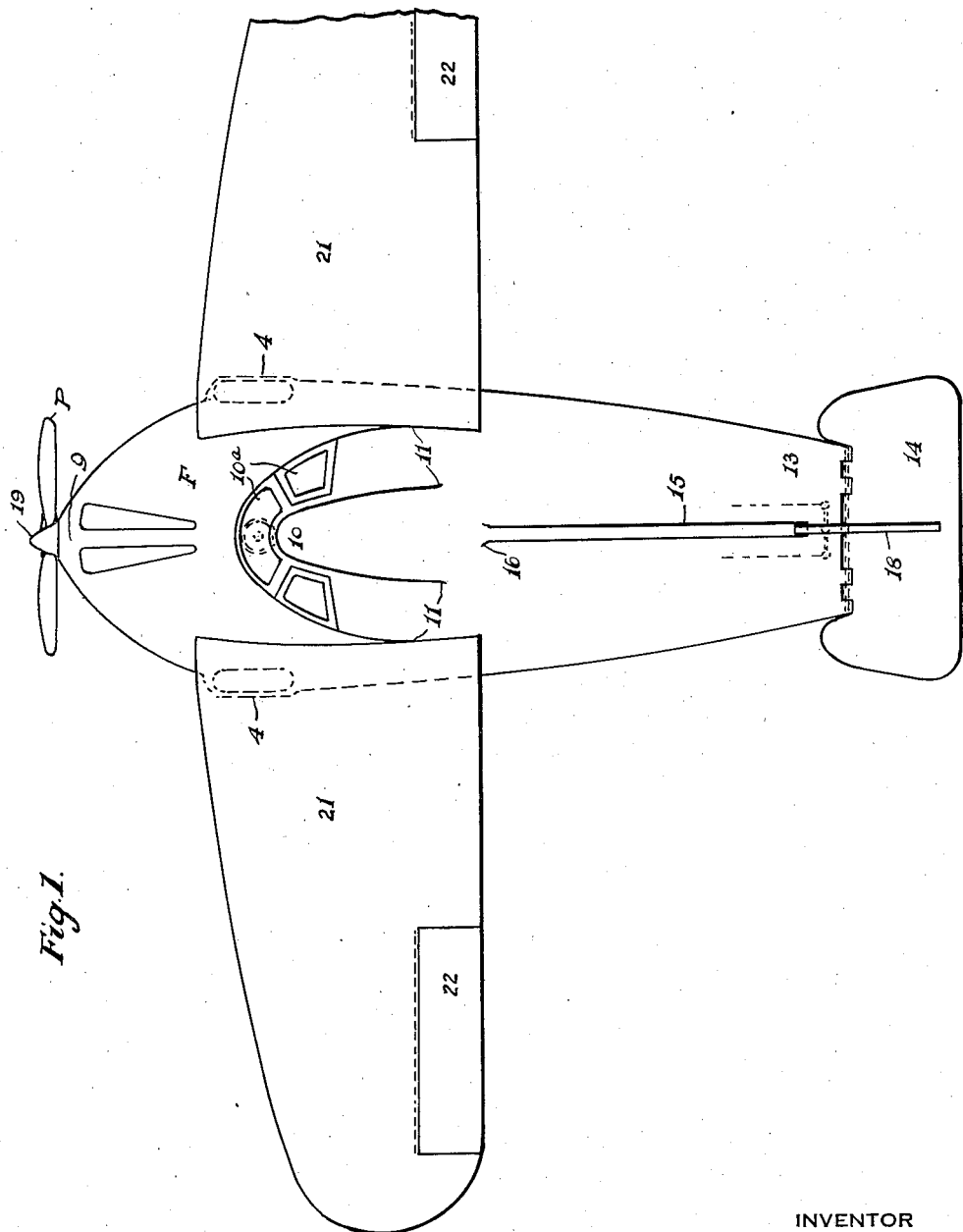
Fig. 1 is a top or plan view of an airplane constructed according to my invention.

Referring now to the drawings in detail, the invention comprises a longitudinally streamlined main-plane fuselage F; the lifting plane surfaces of the under portion are arched or concave as at 1 and the upper outer surface is convexed as at 2. The two surfaces are joined at the front as at 3, by a compound curved leading edge 3 extending down to form opposite box or wheel guards 4 on the opposite joined edges 5. Landing wheels 6 are placed within the box guards and rotate on cross shafts as shown in Fig. 2. From the wheel guards rearwardly toward the tail of the plane, the concave surfaces 1 and the outer convex top surface 2 join in a rearwardly and upwardly leading stream line 8.

The upper convex surface 2 (Fig. 2) rises as shown at 9 at the forward part to the rear of the propeller P which is driven in the usual manner, and about over the landing gear the said surface is developed upwardly and outwardly to form a cabin cowling 10 provided with sight openings or windows 10a closed by glass or other transparent panels; the cowl lines rising upwardly in easy curves, then disappearing at 11, see Fig. 2, by merging into the rear convex surface 2 of the wing structure and receding thence backwardly as at 12 and terminating in a rear thin wedge-like tail portion 13, the lines of which are continued by the upper and lower faces of a pivoted elevator 14, said elevator being swingably movable on an axis, as clearly shown in broken lines in Figs. 1 and 2, said axis being carried by the portion 3, which forms a horizontal stabilizer.

At the rear, the upper portion of the wing fuselage is provided with a centrally arranged longitudinal upstanding fin keel or vertical stabilizer 15, the front end of which develops out of the rear of the cowl portion as at 16, in an easy curve and at the rear is formed with a bearing portion 17 for supporting a pivoted rudder 18.

From the foregoing, it will be apparent that the outer top portion of the plane fuselage is formed with a narrow leading edge, stream lined from front to rear, the stream line effect being further enhanced or accentuated by the contoured development of the lower edges 3 and 8, best shown in Fig. 2.

By referring to Fig. 2 of the drawings, it will be noted that the streamline effect is further carried out on the convex wing portion, in that at the front thereof, adjacent the propeller P, the concaved or arched portion is developed upwardly to meet or register with the line of the propeller hub 19, as at 20.

Suitably attached to the side walls of the plane fuselage are alined auxiliary planes, wings, or stabilizers 21, of any approved cross-sectional contour, which support hinged ailerons 22 of the usual or any approved type. These auxiliary wings or planes should be of a size to afford adequate auxiliary lifting and stabilizing action to supplement the lifting action of the central main wing of the plane to gain altitude and maintain it; to assure stability in normal flight; to permit of quick recovery from abnormal conditions; to assure controlability and maneuverability in restricted territory, and to meet all other requirements.

But of course, said wings need be comparatively short as they only assist in the lift of the plane, and are more important as stabilizers.

I claim:

1. A heavier-than-air aircraft comprising a fuselage body elongated in the direction of flight; the under face of the body being of downwardly and forwardly open tunnel shape, the rear part of said face forming a substantially horizontal surface; the rear part of said body decreasing in top to bottom thickness rearwardly to form a flat rearwardly pointed wedge shape.

2. A heavier-than-air aircraft comprising a fuselage body elongated in the direction of flight; the under face of the body being of downwardly and forwardly open tunnel shape, the rear part of said face forming a substantially horizontal surface; a rear part of the space contained in said tunnel decreasing in top to bottom thickness rearwardly to form a space of flat rearwardly pointed wedge shape.

3. A heavier-than-air aircraft comprising a fuselage body elongated in the direction of flight; the under face of the body being of downwardly and forwardly open tunnel shape, the rear part of said face forming a substantially horizontal surface; the rear part of said body decreasing in top to bottom thickness rearwardly to form a flat rearwardly pointed wedge shape; the rear part of the space contained in said tunnel decreasing in top to bottom thickness rearwardly to form a space of flat rearwardly pointed wedge shape.

4. A heavier-than-air aircraft comprising a fuselage body elongated in the direction of flight; the under face of the body being of downwardly and forwardly open tunnel shape, the rear part of said face forming a substantially horizontal surface; the rear part of said body decreasing in top to bottom thickness rearwardly to form a flat rearwardly pointed wedge shape; and an elevator mounted on the rear end of said body approximately in the plane of the rear part of said lower face.

5. A heavier-than-air aircraft comprising a fuselage body elongated in the direction of flight; the under face of the body being of downwardly and forwardly open tunnel shape, the rear part of said face forming a substantially horizontal surface; the rear part of said body decreasing in top to bottom thickness rearwardly to form a flat rearwardly pointed wedge shape; the rear part of the space contained in said tunnel decreasing in top to bottom thickness rearwardly to form a space of flat rearwardly pointed wedge shape; and an elevator mounted on the rear end of said body approximately in the plane of the rear part of said lower face.

6. In an aircraft, an elongated fuselage provided with an operating compartment, said fuselage having integrally formed therewith a pair of curvilinear extensions adapted to receive undercarriage units, wings associated with said fuselage between said operating compartment and said extensions, said fuselage being further provided at its forward end with propelling means, and at the end opposite said propelling means with elevator and rudder means, mechanism in said operating compartment to control said elevator and rudder, the surface of said fuselage on the lower portion thereof being designed to provide an effective lifting area of the craft.

7. A flying boat including an elongated body, a wing mounted on each side wall of said body and decreasing in thickness in longitudinal direction, the bottom of said body being of a concave, tunnel-like shape, said body decreasing in thickness in the same direction as said wing.

8. A flying boat comprising an elongated body of concave-convex shape, said body decreasing in thickness in a direction opposite to the direction of its travel, the concave portion only of said body forming the bottom face and adapted to provide the main lifting surface of said boat.

9. In aircraft, a fuselage body, the upper face of which is convexed at the forward and middle part and progressively flattened rearwardly, the under face of the body being concaved at the middle and forward part and progressively flattened rearwardly, the rear part of the body being of a horizontal rearwardly pointed wedge shape.

10. In aircraft, a fuselage body, the under face of the body being concaved to a tunnel shape at the middle and forward part, and progressively flattened rearwardly into a horizontal surface.

11. In combination, a combined flying plane and fuselage body of streamline shape, largest forward of its middle part, and longer than wide; the upper face of said body being convexed at the larger part and progressively flattened rearwardly; the under face of the body being substantially longitudinally cylindrically concaved at the middle and forward part, and progressively flattened rearwardly, the rear part of the body being of a flat rearwardly pointed wedge shape.

12. In combination, a combined flying plane and fuselage body largest forward of its middle part, and longer than wide; the under face of the body being substantially longitudinally cylindrically concaved at the middle and forward part, and progressively flattened rearwardly, the rear part of the body being of a flat rearwardly pointed wedge shape; said under face constituting a lifting face; stabilizers at opposite sides of said larger part; and elevators and a rudder at the rear of said body, the elevators being approximately in the plane of said flat part.

13. In aircraft, a fuselage having a convexed top face, a concaved bottom face, both of which faces develop into a horizontal wedge shaped rear part; and elevators and a rudder mounted on the rear end of said body, the elevator being approximately in the plane of said wedge shaped part.

14. In an aircraft, an elongate airfoil body having a transversely curved entering end including lateral downwardly turned portions, undercarriage housings formed by said portions, and a substantially flat horizontal stabilizer formed by the trailing end of said body.

15. In a flying boat comprising a propeller, an elongate airfoil body having a transversely curved entering end, and a substantially flat horizontally disposed after end, said entering end including a top forward portion which carries said propeller, and rearwardly receding lateral downwardly turned portions for engaging water.

Signed at New York, in the county of New York and State of New York this 28th day of February A. D. 1931.

CLARK ROBINSON.